United States Patent Office 2,946,695
Patented July 26, 1960

2,946,695

SELF-HARDENING ALKALI- AND ACID-PROOF WATER GLASS CEMENTS CAPABLE OF SWELLING

Karl Dietz, Kronberg, Taunus, and Guido Max Rudolf Lorentz, Frankfurt am Main, Germany, assignors to Farbwerke Hoechst Aktiengesellschaft vormals Meister Lucius & Bruning, Frankfurt am Main, Germany, a corporation of Germany No Drawing. Filed Apr. 2, 1957, Ser. No. 650,088

Claims priority, application Germany Sept. 11, 1956

9 Claims. (Cl. 106—84)

The present invention relates to self-hardening alkali- and acid-proof water glass cements capable of swelling.

In acid proof construction, especially for the plate lining of apparatus exposed to heat and pressure, there are primarily used mortars that exhibit a certain swelling capacity. During the expansion that the acid proof plate lining and/or the steel jacket undergoes as a result of the operational stress, especially heat and pressure, the swelling capacity of the acid proof mortar gives rise, more or less rapidly, to an initial compression between the plate lining and the steel jacket.

The production of water glass cements which are widely used in acid proof construction hitherto involved the difficulty of obtaining swellable cements which, at the same time, would withstand the action of all acids used in practice.

It is known that the swelling capacity of water glass cements may be brought about or regulated in a simple manner by incorporating therewith metal compounds of cyanamide or mixtures thereof. These metal compounds in which the hydrogen atoms of cyanamide are replaced by metal atoms, may be admixed without difficulty to any water glass cement. The action of heat and especially of warm liquids on these cements then gives rise to a reaction of the cyanamides with the alkali metal silicates to bring about at the same time a hardening and swelling effect in the acid proof mortar. The hardened cementations are acid proof and their uniform increase in volume brings about the aforesaid effects upon the acid proof plate linings.

As metal cyanamides there are used especially compounds of bivalent metals, for example of lead and alkaline earth metals, such as calcium and barium. These compounds are added to the water glass cements in a proportion of 0.1 to 10% calculated upon the cement powder. There may be used all known water glass cements which, optionally, may also contain further additions having a hardening effect, such as silico fluorides, acid amides, acid esters, sulfochlorides or metal oxides, such as lead oxide or zinc oxide. There may also be used water glass cements that contain the alkali metal silicate in pulverulent form in the cement powder. As water glass there may be used potassium or sodium water glass or mixtures thereof.

Now we have found that the resistance to the action of alkaline agents of water glass cements containing metal compounds of cyanamide and, optionally, at least one substance having a hardening effect, such as silico fluorides, sulfochlorides, for example para-toluene sulfochloride and the homologues thereof, acid esters, for example methyl acetate and the homologues thereof, metal oxides, especially oxides of bivalent metals, for example of magnesium, zinc or lead, said hardener being present in an amount of 1–10% calculated on the total weight of the cement powder, and acid amides for example formamide, can be considerably improved by incorporating with these water glass cements a calcium-aluminum-iron silicate in a sintered and finely triturated form. The calcium-aluminum-iron silicate used has approximately the following composition:

| | Percent |
|---|---|
| $SiO_2$ | 5–15 |
| $Al_2O_3$ | 30–50 |
| $Fe_2O_3$ | 5–15 |
| CaO | 35–45 |

It has surprisingly been found that the use of the aforesaid mixtures of finely triturated calcium-aluminum-iron silicate in combination with neutral quartz powder and metal cyanamide compounds in swellable water glass cements leads to the formation of ever reactive cement powders and compositions that withstand storage. It is suitable to use this silicate in a proportion of 5–50% calculated upon the cement powder.

For mixing the cement powders it is advantageous to use potassium water glass solutions with a ratio of $SiO_2:K_2O$ between 1.7 and 2.5 and a ratio of $SiO_2:H_2O$ of more than 0.33 and/or sodium water glass solutions with a $SiO_2:Na_2O$ ratio between about 2.0 and 3.0 and a $SiO_2:H_2O$ ratio of more than 0.33, the use of potassium water glass solutions being preferred. It is also possible to use alkali metal silicate in the form of a readily dissolving powder, or to admix therewith emulsions of plastic materials miscible with water glass solutions, for example polyvinyl chloride or copolymers of vinyl chloride with vinyl acetate.

The water glass cements of the present invention are selfhardening compositions which after hardening withstand the action of alkaline agents. For example, they withstand in the hardened state the action of boiling soda or trisodium phosphate solutions and also the action of concentrated sodium meta silicate solutions contained in many industrial detergents. The cementations made with the use of the above cements possess at the same time a satisfactory stability against the action of dilute organic acids, especially fatty acids and they withstand also the alternating action of acid and alkaline media, a fact which is of considerable importance in practice. Accordingly, the cements of the present invention may be used with special advantage for lining apparatus in which fatty oils are stored or treated.

The following examples serve to illustrate the invention, but they are not intended to limit it thereto, the parts being by weight unless otherwise stated.

Example 1

A cement powder is prepared from 24.5 parts of calcium-aluminum-iron silicate with a $$CaO/Al_2O_3/Fe_2O_3/SiO_2$$

content in the range indicated in the descriptive part of the specification, sintered in clinker form and finely ground, 0.5 part of lead cyanamide and 75 parts of quartz powder. 100 parts of the mixture so obtained are then mixed with 35 parts of a potassium water glass solution containing $SiO_2$ and $K_2O$ in a proportion of 1:2.2 and having a specific weight of 1.32.

Example 2

A cement powder is prepared from 25 parts of a calcium-aluminum-iron silicate with a $$CaO/Al_2O_3/Fe_2O_3/SiO_2$$

content in the range indicated above, sintered in clinker form and finely ground, 5 parts of calcium cyanamide, 5 parts of kaolin, 5 parts of kieselweiss and 60 parts of quartz powder. 100 parts of the mixture so obtained are then mixed with 40 parts of a solution consisting of equal parts of a potassium water glass solution with a molecular proportion of $SiO_2:K_2O$ equaling 1.88 and a specific weight of 1.42 and a sodium water glass solution with a molecular proportion of $SiO_2:Na_2O$ equaling 2.65 and a specific weight of 1.50.

*Example 3*

A cement powder is prepared from 25 parts of a calcium-aluminum-iron silicate with a $$CaO/Al_2O_3/Fe_2O_3/SiO_2$$

content in the range indicated above, sintered in clinker form and finely ground, 30 parts of pulverulent sodium silicate with a $SiO_2:Na_2O$ ratio equaling 2.0, 20 parts of a blast furnace slag deficient in lime with a CaO content of at most 40%, 23 parts of quartz powder and 2 parts of calcium cyanamide. 100 parts of the mixture so obtained are mixed with water which may contain— up to about 50% of its weight—dispersed polyvinyl chloride or a copolymer of vinyl chloride with vinyl acetate.

We claim:

1. Self-hardening alkali-proof and acid-proof water glass cement powder composition capable of swelling consisting essentially of alkali-water glass, 0.1 to 10% of a cyanamide of a bivalent metal selected from the group consisting of lead and alkaline earth metals, an inert inorganic filling material and 5 to 50% of a sintered and finely triturated calcium-aluminum-iron-silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

2. Self-hardening alkali-proof and acid-proof water glass cement powder composition capable of swelling consisting essentially of alkali-water glass, 0.1 to 10% of lead cyanamide, an inert inorganic filling material and 5 to 50% of a sintered and finely triturated calcium-aluminum-iron-silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

3. Self-hardening alkali-proof and acid-proof water glass cement powder composition capable of swelling consisting essentially of alkali-water glass, 1 to 10% of at least one hardener selected from the group consisting of silicofluorides, para-toluene sulfochloride and the homologues thereof, acid esters, acid amides and metal oxides, 0.1 to 10% of lead cyanamide, an inert inorganic filling material and 5 to 50% of a sintered and finely triturated calcium-aluminum-iron-silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

4. Self-hardening alkali-proof and acid-proof water glass cement powder composition capable of swelling consisting essentially of alkali-water glass, 1 to 10% formamide, 0.1 to 10% of lead cyanamide, an inert inorganic filling material, and 5 to 50% of a sintered and finely triturated calcium-aluminum-iron-silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

5. An alkali-water glass composition capable of hardening and consisting essentially of a member selected from the group consisting of sodium water glass solutions, potassium water glass solutions and mixtures thereof, said potassium water glass solutions possessing a ratio of $SiO_2:K_2O$ within the range of 1.7 to 2.5 and a ratio of $SiO_2:H_2O$ of more than 0.33, said sodium water glass solutions possessing a ratio of $SiO_2:Na_2O$ within the range of 2.0 to 3.0 and a ratio of $SiO_2:H_2O$ of more than 0.33, the specific gravity of said water glass solutions being within the range of 1.32 to 1.50, and a cement powder consisting essentially of an inert inorganic filling material, 0.1 to 10% of a cyanamide of a bivalent metal selected from the group consisting of lead and alkaline earth metals, 1 to 10% of at least one hardener selected from the group consisting of silicofluorides, para-toluene sulfochloride and the homologues thereof, acid esters, acid amides and metal oxides, and 5 to 50% of a sintered and finely triturated calcium-aluminum-iron silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

6. An alkali-water glass composition as set forth in claim 5, wherein the cyanamide is lead cyanamide.

7. An alkali-water glass composition capable of hardening and consisting essentially of a member selected from the group consisting of sodium water glass solutions, potassium water glass solutions and mixtures thereof, said potassium water glass solutions possessing a ratio of $SiO_2:K_2O$ within the range of 1.7 to 2.5 and a ratio of $SiO_2:H_2O$ of more than 0.33, said sodium water glass solutions possessing a ratio of $SiO_2:Na_2O$ within the range of 2.0 to 3.0 and a ratio of $SiO_2:H_2O$ of more than 0.33, the specific gravity of said water glass solutions being within the range of 1.32 to 1.50, and a cement powder consisting essentially of an inert inorganic filling material, 0.1 to 10% of a cyanamide of a bivalent metal selected from the group consisting of lead and alkaline earth metals, 1 to 10% of at least one hardener selected from the group consisting of silicofluorides, para-toluene sulfochloride and the homologues thereof, acid esters, acid amides and metal oxides; an organic filling material selected from the group consisting of polyvinylchloride and copolymers of vinyl chloride and vinyl acetate, and 5 to 50% of a sintered and finely triturated calcium-aluminum-iron silicate, wherein the above percentage figures are calculated upon the weight of the cement powder and said calcium-aluminum-iron-silicate consists of 5 to 15% by weight of $SiO_2$,
   30 to 50% by weight of $Al_2O_3$,
   5 to 15% by weight of $Fe_2O_3$, and
   35 to 45% by weight of CaO.

8. Self-hardening alkali-proof and acid-proof water glass cement powder composition capable of swelling consisting essentially of alkali-water glass, 0.1 to 10% of calcium cyanamide, an inert inorganic filling material and 5 to 50% of a sintered and finely triturated calcium-aluminum-iron-silicate, wherein the above percentage figures are calculated upon the weight of the cement powder and said calcium-aluminum-iron-silicate consists of 5 to 15% by weight of $SiO_2$,
30 to 50% by weight of $Al_2O_3$,
5 to 15% by weight of $Fe_2O_3$, and
35 to 45% by weight of CaO.

9. An alkali-water glass composition as set forth in claim 7, wherein the cyanamide is calcium cyanamide.

References Cited in the file of this patent

UNITED STATES PATENTS

| | | |
|---|---|---|
| 2,269,096 | Dietz et al. | Jan. 6, 1942 |
| 2,323,029 | Goodrich | June 29, 1943 |
| 2,839,416 | Dietz | June 17, 1958 |

FOREIGN PATENTS

| | | |
|---|---|---|
| 464,638 | Great Britain | Apr. 21, 1937 |
| 615,405 | Great Britain | Jan. 6, 1949 |
| 437,718 | Great Britain | of 1934 |
| 275,234 | Great Britain | July 26, 1927 |

OTHER REFERENCES

Alien Property Custodian Abstract, Serial No. 380,605, May 11, 1943.